(12) United States Patent
Choi

(10) Patent No.: US 10,215,910 B2
(45) Date of Patent: Feb. 26, 2019

(54) BACKLIGHT UNIT AND DISPLAY APPARATUS INCLUDING THE SAME

(71) Applicant: SAMSUNG DISPLAY CO., LTD., Yongin-si, Gyeonggi-Do (KR)

(72) Inventor: Siyoung Choi, Asan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 120 days.

(21) Appl. No.: 15/489,820

(22) Filed: Apr. 18, 2017

(65) Prior Publication Data
US 2017/0299802 A1    Oct. 19, 2017

(30) Foreign Application Priority Data

Apr. 19, 2016    (KR) .................. 10-2016-0047778

(51) Int. Cl.
*F21V 8/00*    (2006.01)

(52) U.S. Cl.
CPC .......... *G02B 6/0083* (2013.01); *G02B 6/0068* (2013.01)

(58) Field of Classification Search
CPC .... G02B 6/0068; G02B 6/0083; G09G 3/342; G09G 3/3426
See application file for complete search history.

(56) References Cited

U.S. PATENT DOCUMENTS

| 2010/0195014 A1* | 8/2010 | Arihara ............... G02B 6/0055 349/58 |
| 2011/0050682 A1 | 3/2011 | Lin et al. |
| 2013/0038211 A1* | 2/2013 | Kang ............... G02F 1/133603 315/113 |
| 2013/0141667 A1* | 6/2013 | Son ..................... G02B 6/0083 349/62 |

(Continued)

FOREIGN PATENT DOCUMENTS

| JP | 2008084790 | 4/2008 |
| KR | 1020070087333 | 8/2007 |
| KR | 1020070109166 | 11/2007 |

(Continued)

OTHER PUBLICATIONS

Jae-Jin Choi, Nov. 15, 2007, K-PION, Translation document of 10-2007-0109166, pp. 1-9.*

*Primary Examiner* — Alan B Cariaso
(74) *Attorney, Agent, or Firm* — F. Chau & Associates, LLC

(57) ABSTRACT

A backlight unit includes a plurality of light source groups each including a plurality of light source units which generate light. The backlight unit further includes a light source substrate on which the light source groups are disposed and a plurality of light source drivers connected to the light source substrate to drive the light source groups. The light source substrate includes a first extension portion extended in a first direction. The light source units are disposed on the first extension portion. The light source substrate further (Continued)

includes a plurality of second extension portions extended from the first extension portion in a second direction crossing the first direction and a plurality of third extension portions extended from ends of the second extension portions in the first direction. The light source drivers are connected to the third extension portions to drive the light source groups.

20 Claims, 5 Drawing Sheets

(56) References Cited

U.S. PATENT DOCUMENTS

2016/0077270 A1* 3/2016 Komano .............. G02B 6/0028
349/65

FOREIGN PATENT DOCUMENTS

| KR | 1020120090424 | 8/2012 |
|----|---------------|--------|
| KR | 101494310 | 2/2015 |
| KR | 101567035 | 11/2015 |
| KR | 101596791 | 2/2016 |

* cited by examiner

BACKLIGHT UNIT AND DISPLAY APPARATUS INCLUDING THE SAME

CROSS-REFERENCE TO RELATED APPLICATION

This U.S. non-provisional patent application claims priority under 35 U.S.C. § 119 to Korean Patent Application No. 10-2016-0047778 filed on Apr. 19, 2016, the disclosure of which is incorporated by reference herein in its entirety.

TECHNICAL FIELD

The present invention relates to a backlight unit and a display apparatus including the same.

DISCUSSION OF THE RELATED ART

In general, a display apparatus includes a display panel for displaying images and a backlight unit for providing light to the display panel. The display panel may include a first substrate on which a plurality of pixels is disposed, a second substrate disposed facing the first substrate, and an image display layer disposed between the first and second substrates.

An image display layer displays images via pixels. Images may be displayed by adjusting the transmittance of the light provided from the backlight unit via the image display layer. The image display layer may be a liquid crystal layer, an electro-wetting layer, or an electrophoretic layer.

A backlight unit may be an edge-type backlight unit which is disposed on a side surface of a display panel and generates light, or a direct-type backlight unit which is disposed under a display panel and generates light. The backlight unit may include a light source which generates light and a light source driver which drives the light source to generate light. The light source driver may be connected to the light source with a connector

SUMMARY

According to an exemplary embodiment of the present invention, a backlight unit includes a plurality of light source groups each including a plurality of light source units which generate light. The backlight unit further includes a light source substrate on which the light source groups are disposed and a plurality of light source drivers connected to the light source substrate to drive the light source groups. The light source substrate includes a first extension portion extended in a first direction. The light source units are disposed on the first extension portion. The light source substrate further includes a plurality of second extension portions extended from the first extension portion in a second direction crossing the first direction and a plurality of third extension portions extended from ends of the second extension portions in the first direction. The light source drivers are connected to the third extension portions to drive the light source groups.

In an exemplary embodiment of the present invention, the light source substrate is flexible.

In an exemplary embodiment of the present invention, the second extension portions are extended in the second direction from the same side of the first extension portion.

In an exemplary embodiment of the present invention, the backlight unit further includes a plurality of connectors for connecting the light source drivers to the third extension portions.

In an exemplary embodiment of the present invention, the backlight unit further includes a driver circuit substrate on which a timing controller, the light source drivers, and the connectors are disposed.

In an exemplary embodiment of the present invention, the connectors are disposed on an upper surface of the driver circuit substrate.

In an exemplary embodiment of the present invention, the connectors are disposed on a lower surface of the driver circuit substrate.

In an exemplary embodiment of the present invention, the connectors include a first connector disposed adjacent to a first side of the driver circuit substrate. The first side extends in the second direction. The connectors further include a second connector disposed adjacent to a second side of the driver circuit substrate. The second side extends in the second direction. The light source drivers include a first light source driver disposed adjacent to the first connector and connected to the light source substrate through the first connector, and a second light source driver disposed adjacent to the second connector and connected to the light source substrate through the second connector. The first light source driver is disposed between the timing controller and the first connector, and the second light source driver is disposed between the timing controller and the second connector.

In an exemplary embodiment of the present invention, the second extension portions include a $2\_1^{st}$ extension portion extended in the second direction from a first region of the first extension portion which is adjacent to a first side of the first extension portion. The first side extends in the second direction. The second extension portions further include a $2\_2^{nd}$ extension portion extended in the second direction from a second region of the first extension portion which is adjacent to a second side of the first extension portion. The second side extends in the second direction. The third extension portions include a $3\_1^{st}$ extension portion extended from an end of the $2\_1^{st}$ extension portion in the first direction and connected to the first connector, and a $3\_2^{nd}$ extension portion extended from an end of the $2\_2^{nd}$ extension portion in the first direction and connected to the second connector. An end of the $3\_1^{st}$ extension portion and an end of the $3\_2^{nd}$ extension portion face each other.

In an exemplary embodiment of the present invention, the light source groups include a first light source group connected to the first light source driver through the first connector and the $3\_1^{st}$ extension portion connected to the first connector, and a second light source group connected to the second light source driver through the second connector and the $3\_2^{nd}$ extension portion connected to the second connector. The first light source driver drives light source units of the first light source group, and the second light source driver drives light source units of the second light source group.

In an exemplary embodiment of the present invention, the backlight unit further includes a plurality of first connection terminals disposed on an end of the $3\_1^{st}$ extension portion, and a plurality of second connection terminals disposed on an end of the $3\_2^{nd}$ extension portion. Each of the first and second connectors includes a plurality of connection terminals. The $3\_1^{st}$ extension portion is disposed in the first connector, and the first connection terminals contact the connection terminals of the first connector and are electrically connected to the connection terminals of the first connector. The $3\_2^{nd}$ extension portion is disposed in the second connector, and the second connection terminals contact the connection terminals of the second connector and are electrically connected to the connection terminals of the second connector.

According to an exemplary embodiment of the present invention, a display apparatus includes a display panel which generates light and displays an image, a plurality of light source groups each including a plurality of light source units which generate the light, a light source substrate on which the light source groups are disposed, and a plurality of light source drivers connected to the light source substrate to drive the light source groups. The light source substrate includes a first extension portion extended in a first direction. The light source units are disposed on the first extension portion. The light source substrate further includes a plurality of second extension portions extended from the first extension portion in a second direction crossing the first direction and a plurality of third extension portions extended from ends of the second extension portions in the first direction. The light source drivers are connected to the third extension portions to drive the light source groups.

In an exemplary embodiment of the present invention, the display apparatus further includes a plurality of connectors configured to connect the light source drivers to the third extensions.

In an exemplary embodiment of the present invention, the display apparatus further includes a driver circuit substrate on which a timing controller configured to control an operation of the display panel, the light source drivers, and the connectors are disposed.

In an exemplary embodiment of the present invention, the connectors include a first connector disposed adjacent to a first side of the driver circuit substrate. The first side extends in the second direction. The connectors further include a second connector disposed adjacent to a second side of the driver circuit substrate. The second side extends in the second direction. The light source drivers include a first light source driver disposed adjacent to the first connector and connected to the light source substrate through the first connector, and a second light source driver disposed adjacent to the second connector and connected to the light source substrate through the second connector. The first light source driver is disposed between the timing controller and the first connector, and the second light source driver is disposed between the timing controller and the second connector.

In an exemplary embodiment of the present invention, the second extension portions include a $2\_1^{st}$ extension portion extended in a second direction from a first region of the first extension which is adjacent to a first side of the first extension portion. The first side extends in the second direction. The second extension portions further include a $2\_2^{nd}$ extension portion extended in the second direction from a second region of the first extension portion which is adjacent to a second side of the first extension portion. The second side extends in the second direction. The third extension portions include a $3\_1^{st}$ extension portion extended from an end of the $2\_1^{st}$ extension portion in the first direction and connected to the first connector, and a $3\_2^{nd}$ extension portion extended from an end of the $2\_2^{nd}$ extension portion in the first direction and connected to the second connector. An end of the $3\_1^{st}$ extension portion and an end of the $3\_2^{nd}$ extension portion face each other.

In an exemplary embodiment of the present invention, the light source groups include a first light source group connected to the first light source driver through the first connector and the $3\_1^{st}$ extension portion connected to the first connector, and a second light source group connected to the second light source driver through the second connector and the $3\_2^{nd}$ extension portion connected to the second connector. The first light source driver drives the light source units of the first light source group, and the second light source driver drives the light source units of the second light source group.

In an exemplary embodiment of the present invention, the display apparatus further includes a plurality of first connection terminals disposed on an end of the $3\_1^{st}$ extension portion, and a plurality of second connection terminals disposed on an end of the $3\_2^{nd}$ extension portion. Each of the first and second connectors includes a plurality of connection terminals. The $3\_1^{st}$ extension portion is disposed in the first connector, and the first connection terminals contact the connection terminals of the first connector and are electrically connected to the connection terminals of the first connector. The $3\_2^{nd}$ extension portion is disposed in the second connector, and the second connection terminals contact the connection terminals of the second connector and are electrically connected to the connection terminals of the second connector.

According to an exemplary embodiment of the present invention, a backlight unit includes a light source substrate, a plurality of light source units disposed on the light source substrate. The light source units are divided into a plurality of light source groups. The backlight unit further includes a plurality of light source drivers connected to the light source substrate. The light source substrate includes a first extension portion extended in a first direction, a plurality of second extension portions extended from the first extension portion and substantially perpendicular to the first extension portion, and a plurality of third extension portions extended from ends of the plurality of second extension portions and substantially perpendicular to the ends of the plurality of second extension portions. Each light source driver of the plurality of light source drivers is connected to a light source group of the plurality of light source groups through the plurality of third extension portions.

In an exemplary embodiment of the present invention, the backlight unit further includes a plurality of connectors for connecting each light source driver of the plurality of light source drivers to a third extension portion of the plurality of third extension portions.

BRIEF DESCRIPTION OF THE DRAWINGS

The above and other features of the present invention will become more apparent by describing in detail exemplary embodiments thereof, with reference to the accompanying drawings, in which.

DETAILED DESCRIPTION OF THE EMBODIMENTS

Figure 1:
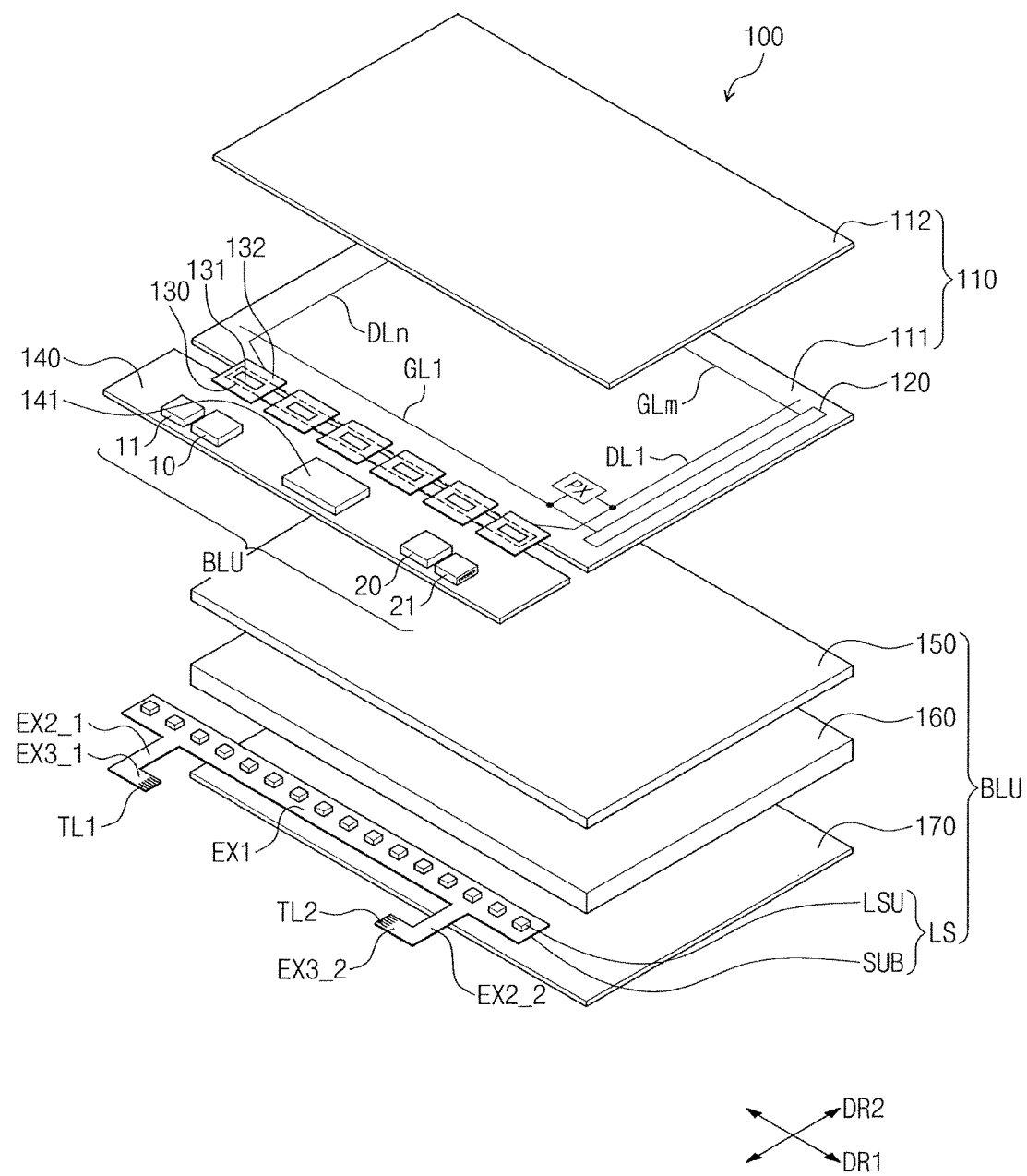
FIG. 1 is a perspective view of a display apparatus according to an exemplary embodiment of the present invention.

Exemplary embodiments of the present invention will be described more fully hereinafter with reference to the accompanying drawings. It is to be understood that the present invention may, however, be embodied in different forms and thus should not be construed as being limited to the exemplary embodiments set forth herein. In the figures, like reference numerals may refer to like elements.

It will be understood that when an element such as a layer, film, region, or substrate is referred to as being "on" another element, it can be directly on the other element or intervening elements may also be present.

FIG. 1 is a schematic perspective view of a display apparatus according to an exemplary embodiment of the present invention.

Referring to FIG. 1, a display apparatus 100 according to an exemplary embodiment of the present invention includes a display panel 110, a gate driver 120, a data driver 130, a driver circuit substrate 140, a timing controller 141, and a backlight unit BLU.

The display panel 110 may have a long side extending in a first direction DR1 and a short side extending in a second direction DR2 crossing the first direction DR1. The backlight unit BLU may generate light and provide the light to the display panel 110, and the display panel 110 may display images using the light provided by the backlight unit BLU.

In an exemplary embodiment of the present invention, the display panel 110 may be a liquid crystal display panel including a liquid crystal layer. However, the display panel 110 is not limited thereto, and may be, for example, an electro-wetting display panel including an electro-wetting layer, or an electrophoretic display panel including an electrophoretic layer.

The display panel 110 includes a first substrate 111, a second substrate 112 facing the first substrate 111, and a liquid crystal layer LC disposed between the first substrate 111 and the second substrate 112. The first substrate 111 has a plurality of pixels PX, a plurality of gate lines GL1~GLm, and a plurality of data lines DL1~DLn disposed thereon. 'm' and 'n' are integers greater than 0. For the convenience of explanation, only one pixel PX is illustrated in FIG. 1. However, a plurality of pixels PX may be disposed on the first substrate 111.

The gate lines GL1~GLm and the data lines DL1~DLn cross each other while being insulated from each other. The gate lines GL1~GLm are extended in the first direction DR1 and connected to the gate driver 120. The data lines DL1~DLn are extended in the second direction DR2 and connected to the data driver 130.

The pixels PX may be arranged in a matrix by being disposed in areas defined by the gate lines GL1~GLm and the data lines DL1~DLn which cross each other. Each of the pixels PX are connected to a corresponding gate line of the gate lines GL1~GLm and to a corresponding data line of the data lines DL1~DLn.

The gate driver 120 is disposed in a region of the first substrate 111 which is adjacent to one side of the first substrate 111 extending in the second direction DR2. The gate driver 120 may be formed simultaneously with transistors of the pixels PX by the same process. The gate driver 120 may be mounted on the first substrate 111 in either an Amorphous Silicon TFT Gate driver circuit (ASG) form or an Oxide Silicon TFT Gate driver circuit (OSG) form.

However, the gate driver 120 is not limited thereto. For example, the gate driver 120 may be provided with a plurality of driving chips, may be mounted on a flexible printed circuit board, and may be connected to the first substrate 111 through the flexible printed circuit board. The gate driver 120 may be connected to the first substrate 111 by a Tape Carrier Package (TCP) method. In addition, the gate driver 120 may be provided with a plurality of driving chips and mounted on the first substrate 111 by the Chip on Glass (COG) method.

The data driver 130 includes a plurality of source driving chips 131. The source driving chips 131 are mounted on a plurality of flexible printed circuit boards 132 and connected to a region of one side of the first substrate 111 extending in the first direction DR1 and to the driver circuit substrate 140 extending in the first direction DR1. In other words, the data driver 130 may be connected to the first substrate 111 by the Tape Carrier Package (TCP) method. However, the data driver 130 is not limited thereto. For example, the data driver 130 may be provided with a plurality of driving chips and may be mounted on the first substrate 111 by the COG method.

The driver circuit substrate 140 has a long side in the first direction DR1 and a short side in the second direction DR2. The driver circuit substrate 140 includes a timing controller 141. The timing controller 141 may be an integrated circuit chip mounted on the driver circuit substrate 140 which is a printed circuit board (PCB). The timing controller 141 may be connected to the gate driver 120 and the data driver 130. For example, the gate driver 120 and the data driver 130 may be connected to the timing controller 141 through the flexible printed circuit board 132 that is connected to the driver circuit substrate 140 on which the timing controller 141 is mounted. The timing controller 141 outputs a gate control signal, a data control signal, and image data.

The gate driver 120 receives the gate control signal from the timing controller 141. The gate driver 120 generates a plurality of gate signals in response to the gate control signal, and outputs the generated gate signals sequentially. The gate signals are provided to the pixels PX through the gate lines GL1~GLm to drive the pixels PX. The pixels PX may be driven row-by-row in response to the gate signals.

The data driver 130 receives image data and the data control signal from the timing controller 141. The data driver 130 generates and outputs analog-type data voltages corresponding to the image data in response to the data control signal. The data voltages are provided to the pixels PX through the data lines DL1~DLm.

The pixels PX are provided with the data voltages through the data lines DL1~DLm in response to gate signals provided through the gate lines GL1~GLm. The pixels PX may show images by displaying gray scales corresponding to the data voltages. The pixels PX driven by the gate signals and the data voltages may show images by adjusting the transmittance of the light provided by the backlight unit BLU.

According to an exemplary embodiment of the present invention, the backlight unit BLU may be an edge-type backlight unit. The backlight unit BLU includes an optical sheet 150, a light guide plate 160, a reflective sheet 170, a light source LS, a plurality of light source drivers 10 and 20, and a plurality of connectors 11 and 21.

The optical sheet 150, the light guide plate 160, and the reflective sheet 170 may have long sides in the first direction DR1, and short sides in the second direction DR2. The light source drivers 10 and 20, and the connectors 11 and 21 are disposed on the driver circuit substrate 140. The light source drivers 10 and 20 may be mounted on the driver circuit substrate 140 in a form of an integrated circuit chip. The light source drivers 10 and 20, and the connectors 11 and 21 which are included in the backlight unit BLU may also be included in the driver circuit substrate 140.

The display panel 110 is disposed over the optical sheet 150, the optical sheet 150 is disposed over the light guide plate 160, and the reflective sheet 170 is disposed under the light guide plate 160. For example, the reflective sheet 170 may be disposed below the light guide plate 160, as illustrated in FIG. 1. The light source LS may extend in the first direction DR1, and may be disposed adjacent to one side of the light guide plate 160 in the first direction DR1.

The light source LS is connected to the light source drivers 10 and 20 through the connectors 11 and 21. The light source LS is driven by the light source drivers 10 and 20 and generates light. The light generated in the light source LS is provided to one side surface of the light guide plate 160. The light provided to the light guide plate 160 is incident to the one side surface of the light guide plate 160. The light guide plate 160 changes the traveling direction of the light provided by the light source LS to a direction towards the display panel 110.

The light source LS includes a light source substrate SUB, which is flexible, and a plurality of light source units LSU, which is mounted on the light source substrate SUB and generate light. The light source units LSU are arranged spaced apart from each other with a substantially equal distance in the first direction DR1, and are adjacent to one side surface of the light guide plate 160. The light source substrate SUB is connected to the light source drivers 10 and 20 through the connectors 11 and 21.

The light source units LSU may be grouped into groups of a predetermined number of light source units LSU. For example, the light source LS includes a plurality of a light source groups, wherein the light source groups may respectively include a predetermined number of light source units LSU. The light source drivers 10 and 20 are respectively connected to the light source units LSU of a corresponding light source group among light source groups through a corresponding connector of the connectors 11 and 21. The light source drivers 10 and 20 respectively drive the light source units LSU of the corresponding light source group. Such configuration will be explained in detail later with reference to FIG. 5 and FIG. 6.

The light source drivers 10 and 20 include a first light source driver 10 and a second light source driver 20, and the connectors 11 and 21 include a first connector 11 and a second connector 21. The first light source driver 10 and the second light source driver 20 may be disposed on the driver circuit substrate 140 with the timing controller 141 interposed therebetween.

The first connector 11 is disposed adjacent to one side of the driver circuit substrate 140 extending in the second direction DR2, and the second connector 21 is disposed adjacent to the other side of the driver circuit substrate 140 extending in the second direction DR2. Both sides of the driver circuit substrate 140 extending in the second direction DR2 face each other. The first light source driver 10 is disposed between the timing controller 141 and the first connector 11, and the second light source driver 20 is disposed between the timing controller 141 and the second connector 21.

The first light source driver 10 is disposed adjacent to the first connector 11 to be connected to the light source substrate SUB of the light source LS through the first connector 11. The second light source driver 20 is disposed adjacent to the second connector 21 to be connected to the light source substrate SUB of the light source LS through the second connector 21. The first connector 11 and the second connector 21 may be female connectors.

The light source substrate SUB includes a first extension portion EX1 extended in the first direction DR1, a plurality of second extension portions EX2_1 and EX2_2 extended from the first extension portion EX1 in the second direction DR2, a plurality of third extension portions EX3_1 and EX3_2 extended from ends of the second extension portions EX2_1 and EX2_2 in the first direction DR1, and a plurality of connection terminals TL_1 and TL_2 disposed on the third extension portions EX3_1 and EX3_2. One of the third extension portions EX3_1 or EX3_2 extends in the first direction DR1 and another of the third extension portions EX3_1 or EX3_2 extends in a direction opposite to the first direction DR1. The first and second connectors 11 and 21 may connect the first and second light source drivers 10 and 20 to the light source substrate SUB by being connected to the third extension portions EX3_1 and EX3_2.

The first extension portion EX1 has a long side in the first direction DR1 and a short side in the second direction DR2. The light source units LSU are disposed on the first extension portion EX1 and arranged in the first direction DR1.

The second extension portions EX2_1 and EX2_2 are extended in the second direction DR2 from the same side of the first extension portion EX1. For example, a first side of the first extension portion EX1 faces the light guide plate 160 in the second direction DR2, and the second extension portions EX2_1 and EX2_2 are extended from a second side of the first extension portion EX1 facing the first side of the first extension portion EX1. For example, the second extension portions EX2_1 and EX2_2 may be substantially perpendicular to the first extension portion EX1.

The second extension portions EX2_1 and EX2_2 include a $2\_1^{st}$ extension portion EX2_1 which extends in the second direction DR2 from a predetermined region of the first extension portion EX1 adjacent to one side of the first extension EX1 extending in the second direction DR2, and a $2\_2^{nd}$ extension portion EX2_2 which extends in the second direction DR2 from a predetermined region of the first extension portion EX1 adjacent to the other side of the first extension portion EX1 extending in the second direction DR2.

The third extension portions EX3_1 and EX3_2 include a $3\_1^{st}$ extension portion EX3_1 which is extended in the first direction DR1 from an end of the $2\_1^{st}$ extension portion EX2_1, and a $3\_2^{nd}$ extension portion EX3_2 which is extended in a direction opposite to the first direction DR1 from an end of the $2\_2^{nd}$ extension portion EX2_2. For example, the third extension portions EX3_1 and EX_2 may be substantially perpendicular to the ends of the second extension portions EX2_1 and EX2_2. An end of the $3\_1^{st}$ extension portion EX3_1 and an end of the $3\_2^{nd}$ extension portion EX3_2 extend respectively from $2\_1^{st}$ and $2\_2^{nd}$ extension portions EX2_1 and EX2_2 such that they face each other. In addition, the third extension portions EX3_1 and EX3_2 extended from the second extension portions EX2_1 and EX2_2 may have a rectangular shape.

The connection terminals TL1 and TL2 include a plurality of first connection terminals TL1 disposed on the $3\_1^{st}$ extension portion EX3_1 in a predetermined region of an end of the $3\_1^{st}$ extension portion EX3_1, and a plurality of second connection terminals TL2 disposed on the $3\_2^{nd}$ extension portion EX3_2 in a predetermined region of an end of the $3\_2^{nd}$ connection terminals EX3_2.

A plurality of wires for connecting the light source units LSU and the first and second connection terminals TL1 and TL2 may be disposed on the light source substrate SUB. In addition, a plurality of wires for connecting the first driver 10 and the first connector 11, and a plurality of wires for connecting the second driver 20 and the second connector 21 may be disposed on the driver circuit substrate 140.

The 3_$1^{st}$ extension portion EX3_1 of the light source substrate SUB is connected to the first connector 11. The 3_$2^{nd}$ extension portion EX3_2 of the light source substrate SUB is connected to the second connector 21.

The first connection terminals TL1 disposed on the 3_$1^{st}$ extension portion EX3_1 are inserted into the first connector 11, which is a female terminal, and are connected to the first connector 11. The second connection terminals TL2 disposed on the 3_$2^{nd}$ extension portion EX3_2 are inserted into the second connector 21, which is a female terminal, and are connected to the second connector 21.

The first light source driver 10 is connected to the 3_$1^{st}$ extension portion EX3_1 of the light source substrate SUB through the first connector 11, and the second light source driver 20 is connected to the 3_$2^{nd}$ extension portion EX3_2 of the light source substrate SUB through the second connector 21. The first and second light source drivers 10 and 20 may be connected to the light source units LSU disposed on the first extension portion EX1 through the 3_$1^{st}$ and 3_$2^{nd}$ extension portions EX3_1 and EX3_2 which are connected to the first and second connectors 11 and 21, respectively.

The light source units LSU driven by the first and second light source drivers 10 and 20 generate light. The light generated by the light source units LSU is provided to one side of the light guide plate 160. The light guide plate 160 guides the light provided from the light source units LSU to the display panel 110. The reflective sheet 170 reflects light that is emitted to a lower portion of the light guide plate 160 towards the display panel 110.

The optical sheet 150 may include a diffusion sheet and a prism sheet, which is disposed on the diffusion sheet. The diffusion sheet may diffuse light provided from the light guide plate 160. The prism sheet may condense the light diffused in the diffusion sheet in a direction (e.g., upward) perpendicular to a bottom surface of the first substrate 111. The light which passes through the prism sheet may travel in an upward direction with a uniform brightness distribution and may be provided to the display panel 110.

Figure 2:
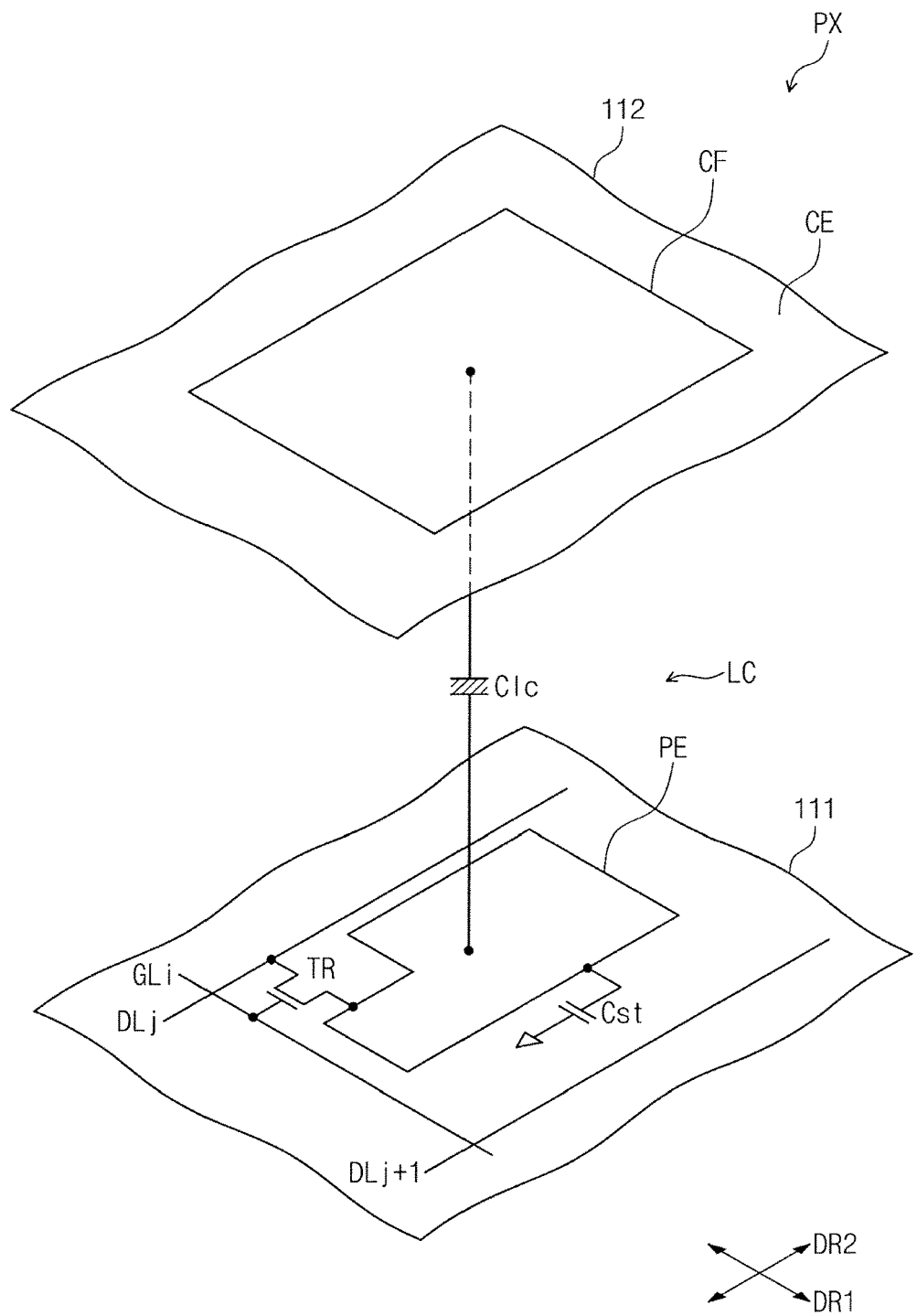
FIG. 2 is a view showing a configuration of a pixel illustrated in FIG. 1 according to an exemplary embodiment of the present invention.

FIG. 2 is a view showing a configuration of the pixel PX illustrated in FIG. 1 according to an exemplary embodiment of the present invention.

For the convenience of explanation, a pixel PX connected to the gate line GLi and the data line DLj is illustrated in FIG. 2. The configuration of the other pixels PX of the display panel 110 may be substantially the same as the configuration of the pixel PX illustrated in FIG. 2.

Referring to FIG. 2, the pixel PX includes a transistor TR connected to the gate line GLi and the data line DLj, a liquid crystal capacitor Clc connected to the transistor TR, and a storage capacitor Cst connected in parallel to the liquid crystal capacitor Clc. The storage capacitor Cst may be omitted. "i" and "j" are natural numbers.

The transistor TR may be disposed on the first substrate 111. The transistor TR includes a gate electrode connected to the gate line GLi, a source electrode connected to the data line DLj, and a drain electrode connected to the liquid crystal capacitor Clc and the storage capacitor Cst.

The liquid crystal capacitor Clc includes a pixel electrode PE disposed on the first substrate 111, a common electrode CE disposed on the second substrate 112, and a liquid crystal layer LC disposed between the pixel electrode PE and the common electrode CE. The liquid crystal layer LC serves as a dielectric layer and includes liquid crystal molecules. The pixel electrode PE is connected to the drain electrode of the transistor TR.

In FIG. 2, the pixel electrode PE has a non-slit structure, but the present invention is not limited thereto. The pixel electrode PE may have a slit structure including a cross-shaped base line and a plurality of branches extended radially from the base line.

The common electrode CE may be entirely disposed on the second substrate 112, but the present invention is not limited thereto. For example, the common electrode CE may be disposed on the first substrate 111. In this case, at least one of the pixel electrode PE and the common electrode CE may include a slit structure.

The storage capacitor Cst may include a pixel electrode PE, a storage electrode branched from a storage line, and an insulating layer disposed between the pixel electrode PE and the storage electrode. The storage line is disposed on the first substrate 111 and may be simultaneously formed on the same layer as the gate lines GL1 to GLm. The storage electrode may be partially overlapped by the pixel electrode PE.

The pixel PX may further include a color filter CF to show one of red, green, and blue colors. In an exemplary embodiment of the present invention, the color filter CF may be disposed on the second substrate 112 as illustrated in FIG. 2, but the present invention is not limited thereto. For example, the color filter CF may be disposed on the first substrate 111.

The transistor TR is turned on in response to a gate signal provided through the gate line GLi. A data voltage, which is received through the data line DLj, is provided to the pixel electrode PE of the liquid crystal capacitor Clc through the turned-on transistor TR. A common voltage is applied to the common electrode CE.

Due to a difference in voltage levels of the data voltage and the common voltage, an electric field is formed between the pixel electrode PE and the common electrode CE. The liquid crystal molecules of the liquid crystal layer LC are driven by the electric field formed between the pixel electrode PE and the common electrode CE. Light transmittance is adjusted by the liquid crystal molecules driven by the electric field, and thus, images may be displayed.

A storage voltage having a constant voltage level may be applied to the storage line, but the present invention is not limited thereto. The storage line may have a common voltage applied thereto. The storage capacitor Cst serves a role to complement the voltage charged in the liquid crystal capacitor Clc.

Figure 3:
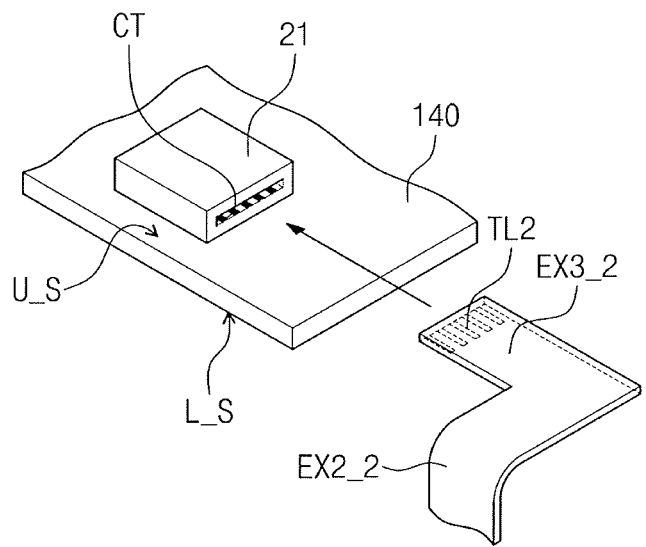
FIG. 3 is a view showing a connection configuration of a second connector and second connection terminals illustrated in FIG. 1 according to an exemplary embodiment of the present invention.

FIG. 3 is a view showing a connection configuration of the second connector 21 and the second connection terminals TL2 illustrated in FIG. 1 according to an exemplary embodiment of the present invention.

Referring to FIG. 3, since the light source substrate SUB is flexible, the 2_$2^{nd}$ extension portion EX2_2 may be bent. When the 2_$2^{nd}$ extension portion EX2_2 is bent, the second connection terminals TL2 disposed on the 3_$2^{nd}$ extension portion EX3_2 may face downward. The second connector 21 is disposed on an upper surface U_S of the driver circuit substrate 140. The opposite surface of the upper surface U_S of the driver circuit substrate 140 is defined as the lower surface L_S of the driver circuit substrate 140.

The second connector 21 is a female terminal and includes a plurality of connection terminals CT. The 3_$2^{nd}$ extension portion EX3_2 is inserted into the second connector 21, and the second connection terminals TL2 disposed on the 3_2$^{nd}$ extension portion EX3_2 may come into contact with the connection terminals CT of the second connector 21 to be electrically connected to the connection terminals CT of the second connector 21.

The first connector 11 and the first connection terminals TL1 illustrated in FIG. 1 may be connected by the same method as the connection method of the second connector 21 and the second connection terminals TL2. For example, the first connector 11 includes a plurality of connection terminals CT, and the 3_1$^{st}$ extension portion EX3_1 is inserted into the first connector 11. The first connection terminals TL1 disposed on the 3_1$^{st}$ extension portion EX3_1 may come into contact with the connection terminals CT of the first connector 11 to be electrically connected to the connection terminals CT of the first connector 11.

Figure 4:
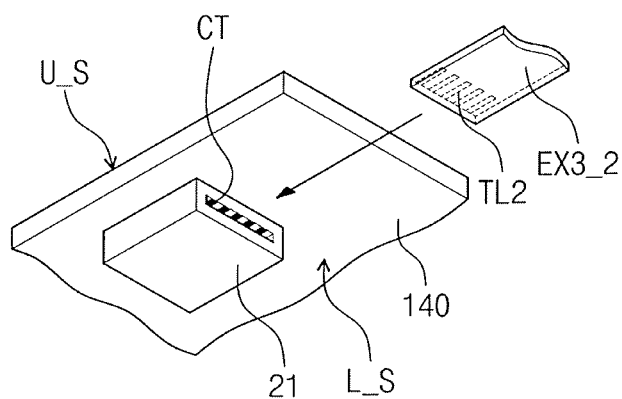
FIG. 4 is a view showing a connection configuration of a second connector and second connection terminals according to an exemplary embodiment of the present invention.

FIG. 4 is a view showing a connection configuration of the second connector 21 and the second connection terminals TL2 according to an exemplary embodiment of the present invention.

Referring to FIG. 4, the second connector 21 may be disposed on the lower surface L_S of the driver circuit substrate 140. The first connector 11 may also be disposed on the lower surface L_S of the driver circuit substrate 140. In this case, the 2_2$^{nd}$ extension portion EX2_2 is bent and the second connection terminals TL2 disposed on the 3_2$^{nd}$ extension portion EX3_2 may face upward. For example, 2_2$^{nd}$ extension portion EX2_2 may be bent such that the second connection terminals TL2 face upward, and/or the second connection terminals may be disposed facing upward on an upper surface of the 3_2$^{nd}$ extension portion EX3_2.

The 3_2$^{nd}$ extension portion EX3_2 may be inserted into the second connector 21, and the second connection terminals T2 may be electrically connected to the connection terminals CT of the second connector 21. In addition, the 3_1$^{st}$ extension portion EX3_1 may be inserted into the first connector 11, and the first connection terminals TL1 may be electrically connected to the connection terminals CT of the first connector 11.

Figure 5:
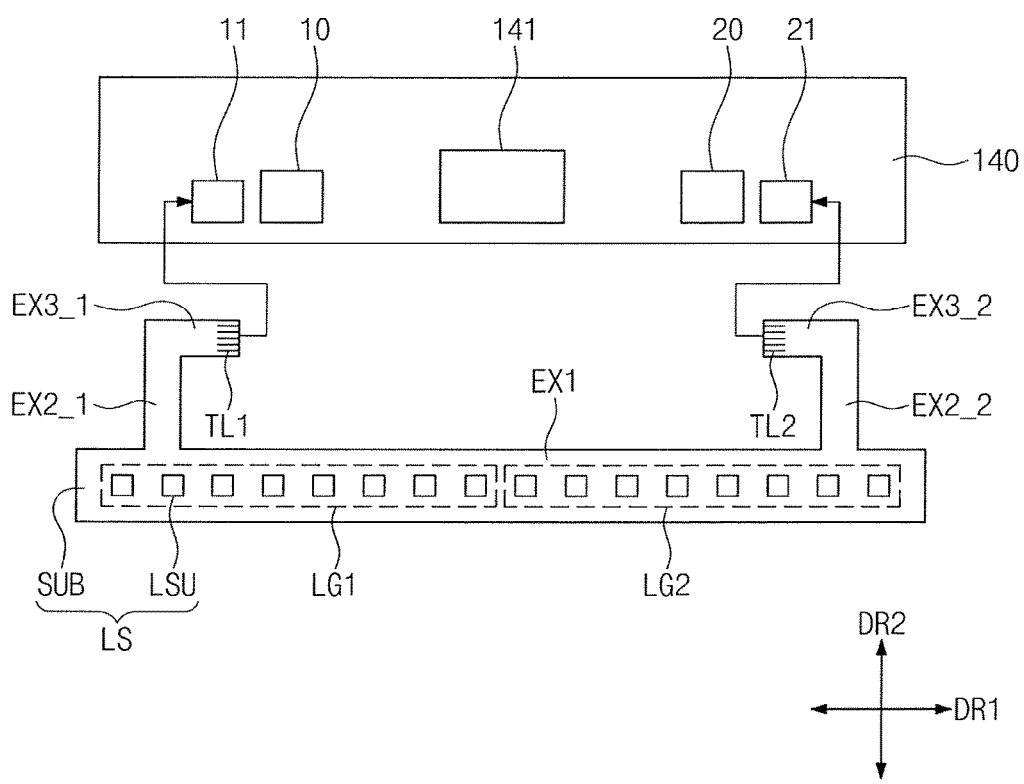
FIG. 5 is a plan view of a light source and a driver circuit substrate illustrated in FIG. 1 according to an exemplary embodiment of the present invention.

FIG. 5 is a plan view of the light source LS and the driver circuit substrate 140 illustrated in FIG. 1 according to an exemplary embodiment of the present invention.

Referring to FIG. 5, the light source LS includes a plurality of light source groups LG1 and LG2, and each of the light source groups LG1 and LG2 includes a plurality of light source units LSU. The light source groups LG1 and LG2 include a first light source group LG1 driven by the first light source driver 10 and a second light source group LG2 driven by the second light source driver 20.

The number of the light source units LSU of the first light source group LG1 and the number of the light source units LSU of the second light source group LG2 may be the same, but the present invention is not limited thereto. For example, the number of the light source units LSU of the first light source group LG1 and the number of the light source units LSU of the second light source group LG2 may be different.

As described above, the 3_1$^{st}$ extension portion EX3_1 is inserted into the first connector 11, and the first connection terminals TL1 disposed on the 3_1$^{st}$ extension portion EX3_1 are electrically connected to the connection terminals CT of the first connector 11. The first light source driver 10 is connected to the light source units LSU of the first light source group LG1 through the first connector 11 and the 3_1$^{st}$ extension portion EX3_1 connected to the first connector 11. Accordingly, the first light source driver 10 may drive the light source units LSU of the first light source group LG1.

The 3_2$^{nd}$ extension portion EX3_2 is inserted into the second connector 21, and the second connection terminals TL2 disposed on the 3_2$^{nd}$ extension portion EX3_2 are electrically connected to the connection terminals CT of the second connector 21. The second light source driver 20 is connected to the light source units LSU of the second light source group LG2 through the second connector 21 and the 3_2$^{nd}$ extension portion EX3_2 connected to the second connector 21. Accordingly, the second light source driver 20 may drive the light source units LSU of the second light source group LG2.

Accordingly, the first and second light source drivers 10 and 20 are dispersedly connected to the light source LS through the first and second connectors 11 and 21, respectively. The first and second light source drivers 10 and 20 may drive the light source units LSU of the first and second light source groups LG1 and LG2.

When one light source driver and one connector are used, and the light source driver is connected to a light source LS through the connector to drive all of the light source units LSU of the light source LS, the light source driver may overheat and elements of the light source driver may be damaged.

However, in an exemplary embodiment of the present invention, the plurality of light source drivers 10 and 20 are dispersedly connected to the light source LS through the plurality of connectors 11 and 21. Each of the plurality of the light source drivers 10 and 20 may drive the light source units LSU of the corresponding light source group of the light source groups LG1 and LG2. In this case, the heat source may be dispersed, and therefore, the heat generation of the light source drivers 10 and 20 may be reduced and damage of the elements of the light source drivers 10 and 20 may be prevented.

Accordingly, the display apparatus 100 according to an exemplary embodiment of the present invention disperses connection positions of the light source drivers 10 and 20 which drive the light source groups LG1 and LG2. Therefore, the heat generation of the light source drivers 10 and 20 may be reduced.

Figure 6:
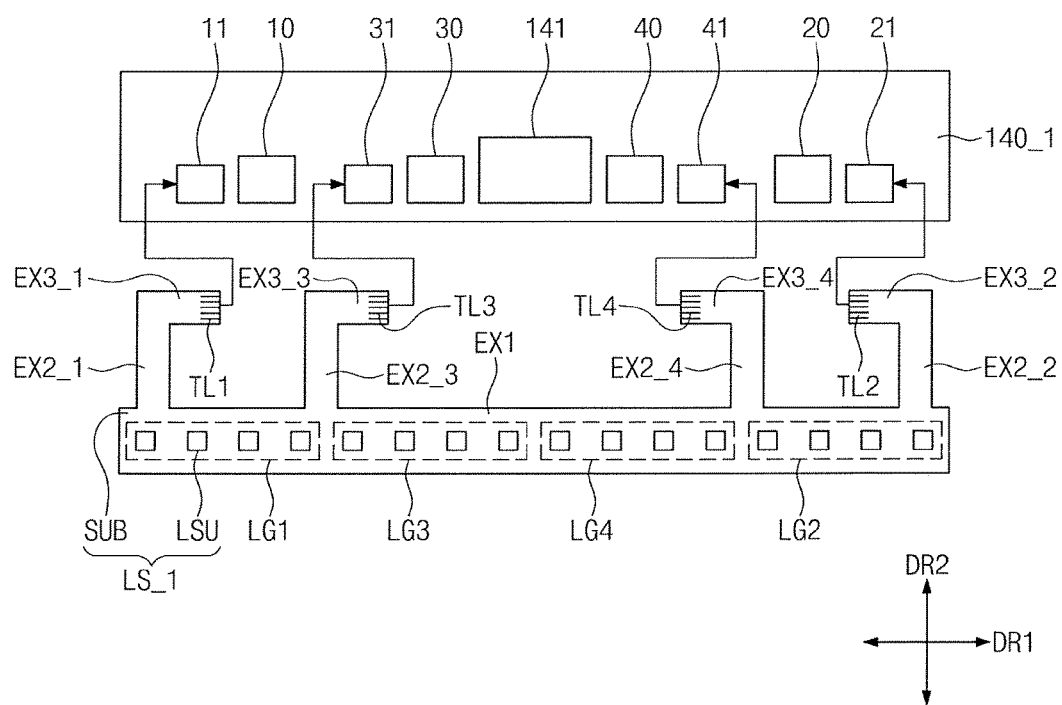
FIG. 6 is a plan view of a light source and a driver circuit substrate of the display apparatus according to an exemplary embodiment of the present invention.

FIG. 6 is a plan view of a light source LS_1 of a display apparatus 100 and a driver circuit substrate 140_1 according to an exemplary embodiment of the present invention.

Hereinafter, configurations of a light source LS_1 and a driver circuit substrate 140_1 illustrated in FIG. 6 will be described while focusing on differences from that of the light source LS and the driver circuit substrate 140 illustrated in FIG. 5.

Referring to FIG. 6, the driver circuit substrate 140_1 includes a timing controller 141, first to fourth light source drivers 10 to 40, and first to fourth connectors 11 to 41. Except that the number of the light source drivers and the connectors is larger than that of FIG. 5, the configurations of the first to fourth light source drivers 10 to 40 and the first to fourth connectors 11 to 41 are substantially the same as those of the first and second light source drivers 10 and 20 and the first and second connectors 11 and 21 illustrated in FIG. 1, FIG. 3 and FIG. 5, and therefore, an explanation is omitted.

The first connector 11 is disposed adjacent to one side of the driver circuit substrate 140 extending in the second direction DR2, and the second connector 21 is disposed adjacent to the other side of the driver circuit substrate 140 in the second direction DR2. The first light source driver 10 is disposed between the timing controller 141 and the first connector 11, and disposed adjacent to the first connector 11. The second light source driver 20 is disposed between the timing controller 141 and the second connector 21, and disposed adjacent to the second connector 21.

The third light source driver 30 and the third connector 31 are disposed between the first light source driver 10 and the timing controller 141 while being disposed adjacent to each other. The third light source driver 30 may be disposed adjacent to the timing controller 141. The fourth light source driver 40 and the fourth connector 41 are disposed between the second light source driver 20 and the timing controller 141 while being disposed adjacent to each other. The fourth light source driver 40 may be disposed adjacent to the timing controller 141.

The light source LS_1 includes the first to fourth light source groups LG1 to LG4 respectively including a plurality of light source units LSU. The first light source group LG1 is driven by the first light source driver 10. The second light source group LG2 is driven by the second light source driver 20. The third light source group LG3 is driven by the third light source driver 30. The fourth light source group LG4 is driven by the fourth light source driver 40.

The third and fourth light source groups LG3 and LG4 are disposed between the first light source group LG1 and the second light source group LG2. The third light source group LG3 is disposed adjacent to the first light source group LG1, and the fourth light source group LG4 is disposed adjacent to the second light source group LG2.

The light source LS_1 includes a first extension portion EX1 extended in the first direction DR1, $2\_1^{st}$ through $2\_4^{th}$ extension portions EX2_1 to EX2_4 each extended in the second direction DR2 from the first extension portion EX1, $3\_1^{st}$ to $3\_4^{th}$ extension portions EX3_1 to EX3_4 each extended in the first direction DR1 from respective ends of the $2\_1^{st}$ to $2\_4^{th}$ extension portions EX2_1 to EX2_4, and a first to fourth connection terminals TL1 to TL4 respectively disposed on the $3\_1^{st}$ to $3\_4^{th}$ extension portions EX3_1 to EX3_4.

The configurations of the first extension portion EX1, the $2\_1^{st}$ and the $3\_1^{st}$ extension portions EX2_1 and EX3_1, and the $2\_2^{nd}$ and $3\_2^{nd}$ extension portions EX2_2 and EX3_2 illustrated in FIG. 6 are substantially the same as those illustrated in FIG. 5. In addition, a shape of the $3\_3^{rd}$ extension portion EX3_3 extended from the $2\_3^{rd}$ extension portion EX2_3 and an end of the $2\_3^{rd}$ extension portion EX2_3 is substantially the same as those of the $2\_1^{st}$ and $3\_1^{st}$ extension portions EX2_1 and EX3_1. Further, the shape of the $3\_4^{th}$ extension portion EX3_4 extended from the $2\_4^{th}$ extension portion EX2_4 and an end of the $2\_4^{th}$ extension portion EX2_4 is substantially the same as those of the $2\_2^{nd}$ and $3\_2^{nd}$ extension portions EX2_2 and EX3_2.

The $2\_3^{rd}$ and $3\_3^{rd}$ extension portions EX2_3 and EX3_3 and the $2\_4^{th}$ and $3\_4^{th}$ extension portions EX2_4 and EX3_4 are disposed between the $2\_1^{st}$ and $3\_1^{st}$ extension portions EX2_1 and EX3_1 and the $2\_2^{nd}$ and $3\_2^{nd}$ extension portions EX2_2 and EX3_2. The $2\_3^{rd}$ and $3\_3^{rd}$ extension portions EX2_3 and EX3_3 are disposed adjacent to the $2\_1^{st}$ and $3\_1^{st}$ extension portions EX2_1 and EX3_1, and the $2\_4^{th}$ and $3\_4^{th}$ extension portions EX2_4 and EX3_4 are disposed adjacent to the $2\_2^{nd}$ and $3\_2^{nd}$ extension portions EX2_2 and EX3_2.

The configuration in which the first to fourth connection terminals TL1 to TL4 are electrically connected to connection terminals CT of the first to fourth connectors 11 to 41 is substantially the same as the configurations described with reference to FIG. 3 and/or FIG. 4, and therefore, an explanation is omitted.

The first light source driver 10 is connected to the light source units LSU of the first light source group LG1 through the first connector 11 and the $3\_1^{st}$ extension portion EX3_1 which are connected to each other. The first light source driver 10 may drive the light source units LSU of the first light source group LG1. The second light source driver 20 is connected to the light source units LSU of the second light source group LG2 through the second connector 21 and the $3\_2^{nd}$ extension portion EX3_2 which are connected to each other. The second light source driver 20 may drive the light source units LSU of the second light source group LG2.

The third light source driver 30 is connected to the light source units LSU of the third light source group LG3 through the third connector 31 and the $3\_3^{rd}$ extension portion EX3_3 which are connected to each other. The third light source driver 30 may drive the light source units LSU of the third light source group LG3. The fourth light source driver 40 is connected to the light source units LSU of the fourth light source group LG4 through the fourth connector 41 and the $3\_4^{th}$ extension portion EX3_4 which are connected to each other. The fourth light source driver 40 may drive the light source units LSU of the fourth light source group LG4.

The connection positions of the first to fourth light source drivers 10, 20, 30 and 40 for respectively driving the first to fourth light source groups LG1, LG2, LG3 and LG4 are dispersed, and therefore, the heat generation of the light source drivers 10, 20, 30, and 40 may be reduced.

A backlight unit and a display apparatus including the same according to an exemplary embodiment of the present invention may reduce the heat generation of light source drivers by dispersing connection positions of the light source drivers which drive light source of the backlight unit.

While the present invention has been particularly shown and described with reference to exemplary embodiments thereof, it will be apparent to those of ordinary skill in the art that various changes in form and detail may be made thereto without departing from the spirit and scope of the present invention as defined by the claims.

What is claimed is:

1. A backlight unit, comprising:
   a plurality of light source groups each including a plurality of light source units which generate light;
   a light source substrate on which the light source groups are disposed; and
   a plurality of light source drivers connected to the light source substrate to drive the light source groups,
   wherein the light source substrate includes:
   a first extension portion extended in a first direction, wherein the light source units are disposed on the first extension portion;
   a plurality of second extension portions extended from the first extension portion in a second direction crossing the first direction; and
   a plurality of third extension portions extended from ends of the second extension portions in the first direction, and wherein the light source drivers are connected to the third extension portions to drive the light source groups.

2. The backlight unit of claim 1, wherein the light source substrate is flexible.

3. The backlight unit of claim 1, wherein the second extension portions are extended in the second direction from the same side of the first extension portion.

4. The backlight unit of claim 1, further comprising a plurality of connectors for connecting the light source drivers to the third extension portions.

5. The backlight unit of claim 4, further comprising a driver circuit substrate on which:
   a timing controller, the light source drivers, and the connectors are disposed.

6. The backlight unit of claim 5, wherein the connectors are disposed on an upper surface of the driver circuit substrate.

7. The backlight unit of claim 5, wherein the connectors are disposed on a lower surface of the driver circuit substrate.

8. The backlight unit of claim 5, wherein the connectors comprise:
   a first connector disposed adjacent to a first side of the driver circuit substrate, wherein the first side extends in the second direction; and
   a second connector disposed adjacent to a second side of the driver circuit substrate, wherein the second side extends in the second direction, and
   wherein the light source drivers comprise:
   a first light source driver disposed adjacent to the first connector and connected to the light source substrate through the first connector; and
   a second light source driver disposed adjacent to the second connector and connected to the light source substrate through the second connector,
   wherein the first light source driver is disposed between the timing controller and the first connector, and the second light source driver is disposed between the timing controller and the second connector.

9. The backlight unit of claim 8, wherein the second extension portions comprise:
   a $2\_1^{st}$ extension portion extended in the second direction from a first region of the first extension portion which is adjacent to a first side of the first extension portion, wherein the first side extends in the second direction; and
   a $2\_2^{nd}$ extension portion extended in the second direction from a second region of the first extension portion which is adjacent to a second side of the first extension portion, wherein the second side extends in the second direction, and wherein the third extension portions include:
   a $3\_1^{st}$ extension portion extended from an end of the $2\_1^{st}$ extension portion in the first direction and connected to the first connector; and
   a $3\_2^{nd}$ extension portion extended from an end of the $2\_2^{nd}$ extension portion in the first direction and connected to the second connector, wherein an end of the $3\_1^{st}$ extension portion and an end of the $3\_2^{nd}$ extension portion face each other.

10. The backlight unit of claim 9, wherein the light source groups comprise:
    a first light source group connected to the first light source driver through the first connector and the $3\_1^{st}$ extension portion connected to the first connector; and
    a second light source group connected to the second light source driver through the second connector and the $3\_2^{nd}$ extension portion connected to the second connector,
    wherein the first light source driver drives light source units of the first light source group, and the second light source driver drives light source units of the second light source group.

11. The backlight unit of claim 9, further comprising:
    a plurality of first connection terminals disposed on an end of the $3\_1^{st}$ extension portion; and
    a plurality of second connection terminals disposed on an end of the $3\_2^{nd}$ extension portion,
    wherein each of the first and second connectors includes a plurality of connection terminals,
    wherein the $3\_1^{st}$ extension portion is disposed in the first connector, and the first connection terminals contact the connection terminals of the first connector and are electrically connected to the connection terminals of the first connector, and
    wherein the $3\_2^{nd}$ extension portion is disposed in the second connector, and the second connection terminals contact the connection terminals of the second connector and are electrically connected to the connection terminals of the second connector.

12. A display apparatus, comprising:
    a display panel which generates light and displays an image;
    a plurality of light source groups each including a plurality of light source units which generate the light;
    a light source substrate on which the light source groups are disposed; and
    a plurality of light source drivers connected to the light source substrate to drive the light source groups,
    wherein the light source substrate includes:
    a first extension portion extended in a first direction, wherein the light source units are disposed on the first extension portion;
    a plurality of second extension portions extended from the first extension portion in a second direction crossing the first direction; and
    a plurality of third extension portions extended from ends of the second extension portions in the first direction, and
    wherein the light source drivers are connected to the third extension portions to drive the light source groups.

13. The display apparatus of claim 12, further comprising:
    a plurality of connectors configured to connect the light source drivers to the third extensions.

14. The display apparatus of claim 13, further comprising a driver circuit substrate on which:
    a timing controller configured to control an operation of the display panel, the light source drivers, and the connectors are disposed.

15. The display apparatus of claim 14, wherein the connectors comprise:
    a first connector disposed adjacent to a first side of the driver circuit substrate, wherein the first side extends in the second direction; and
    a second connector disposed adjacent to a second side of the driver circuit substrate, wherein the second side extends in the second direction, and
    wherein the light source drivers include:
    a first light source driver disposed adjacent to the first connector and connected to the light source substrate through the first connector; and
    a second light source driver disposed adjacent to the second connector and connected to the light source substrate through the second connector, wherein the first light source driver is disposed between the timing controller and the first connector, and the second light source driver is disposed between the timing controller and the second connector.

16. The display apparatus of claim 15, wherein the second extension portions comprise:
    a $2\_1^{st}$ extension portion extended in a second direction from a first region of the first extension which is adjacent to a first side of the first extension portion, wherein the first side extends in the second direction; and a $2\_2^{nd}$ extension portion extended in the second direction from a second region of the first extension portion which is adjacent to a second side of the first extension portion, wherein the second side extends in the second direction, and wherein the third extension portions comprise:

a $3\_1^{st}$ extension portion extended from an end of the $2\_1^{st}$ extension portion in the first direction and connected to the first connector; and a $3\_2^{nd}$ extension portion extended from an end of the $2\_2^{nd}$ extension portion in the first direction and connected to the second connector, wherein an end of the $3\_1^{st}$ extension portion and an end of the $3\_2^{nd}$ extension portion face each other.

17. The display apparatus of claim 16, wherein the light source groups comprise:

a first light source group connected to the first light source driver through the first connector and the $3\_1^{st}$ extension portion connected to the first connector; and a second light source group connected to the second light source driver through the second connector and the $3\_2^{nd}$ extension portion connected to the second connector, wherein the first light source driver drives the light source units of the first light source group, and the second light source driver drives the light source units of the second light source group.

18. The display apparatus of claim 16, further comprising:

a plurality of first connection terminals disposed on an end of the $3\_1^{st}$ extension portion; and a plurality of second connection terminals disposed on an end of the $3\_2^{nd}$ extension portion, wherein each of the first and second connectors includes a plurality of connection terminals, wherein the $3\_1^{st}$ extension portion is disposed in the first connector, and the first connection terminals contact the connection terminals of the first connector and are electrically connected to the connection terminals of the first connector, and wherein the $3\_2^{nd}$ extension portion is disposed in the second connector, and the second connection terminals contact the connection terminals of the second connector and are electrically connected to the connection terminals of the second connector.

19. A backlight unit, comprising:

a light source substrate;

a plurality of light source units disposed on the light source substrate, wherein the light source units are divided into a plurality of light source groups; and a plurality of light source drivers connected to the light source substrate, wherein the light source substrate includes:

a first extension portion extended in a first direction;

a plurality of second extension portions extended from the first extension portion and substantially perpendicular to the first extension portion; and a plurality of third extension portions extended from ends of the plurality of second extension portions and substantially perpendicular to the ends of the plurality of second extension portions, and wherein each light source driver of the plurality of light source drivers is connected to a light source group of the plurality of light source groups through the plurality of third extension portions.

20. The backlight unit of claim 19, further comprising a plurality of connectors for connecting each light source driver of the plurality of light source drivers to a third extension portion of the plurality of third extension portions.

* * * * *